United States Patent [19]

Aoki

[11] Patent Number: 4,732,557
[45] Date of Patent: Mar. 22, 1988

[54] STRETCHING BLOW MOLDING APPARATUS FOR CUP-LIKE CONTAINERS

[75] Inventor: Daiichi Aoki, Nagano, Japan
[73] Assignee: Nissei ASB Machine Co., Ltd., Japan
[21] Appl. No.: 791,368
[22] Filed: Oct. 25, 1985

[30] Foreign Application Priority Data

Oct. 31, 1984 [JP] Japan .................. 59-229723

[51] Int. Cl.[4] .................. B29C 49/00; B29C 49/12
[52] U.S. Cl. .................. 425/522; 264/537; 264/538; 425/529; 425/534; 425/537; 425/540
[58] Field of Search .............. 425/522, 526, 528, 533, 425/529, 534, 537, 540, 532; 264/537, 538

[56] References Cited

U.S. PATENT DOCUMENTS 3,944,643  3/1976  Sato et al. .................. 425/529
4,105,391  8/1978  Aoki .................. 425/526

Primary Examiner—Jay H. Woo
Assistant Examiner—Timothy W. Heitbrink
Attorney, Agent, or Firm—Ostrolenk, Farber, Gerb & Soffen

[57] ABSTRACT

The present invention provides an injection stretch blow molding apparatus in which a peripheral edge of a flat preform forms the edge or lip portion of a cup-like container. A securing or grip mold and a core mold are brought together to form the lip. The securing or grip mold is carried on the underside of a rotary transfer disk. The peripheral edge of the preform is sandwiched in between a shoulder formed at the lower end of a blow core and the securing or grip mold when stretch blow molding is performed, resulting in a cup-like container. The finished container is then removed upwardly from the securing or grip mold.

16 Claims, 8 Drawing Figures

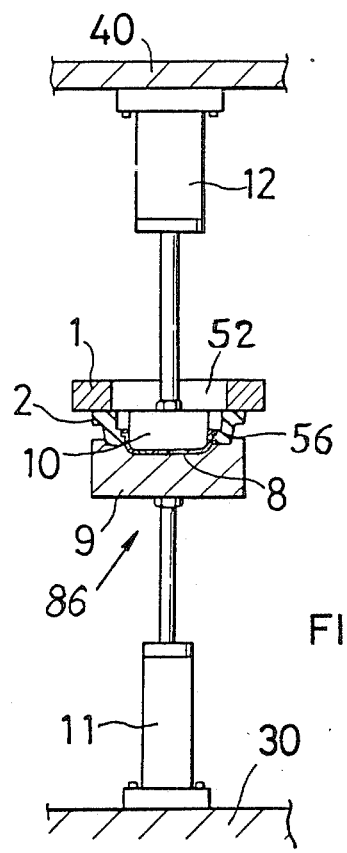
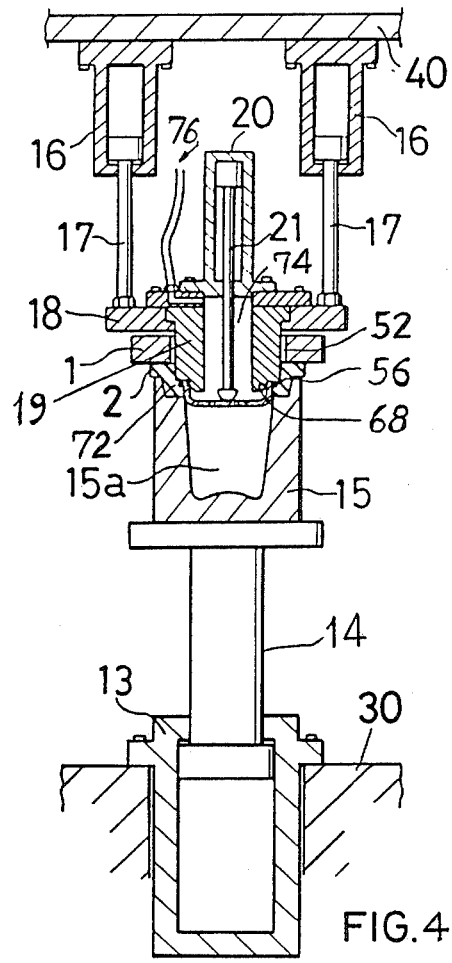
FIG.3
FIG.4

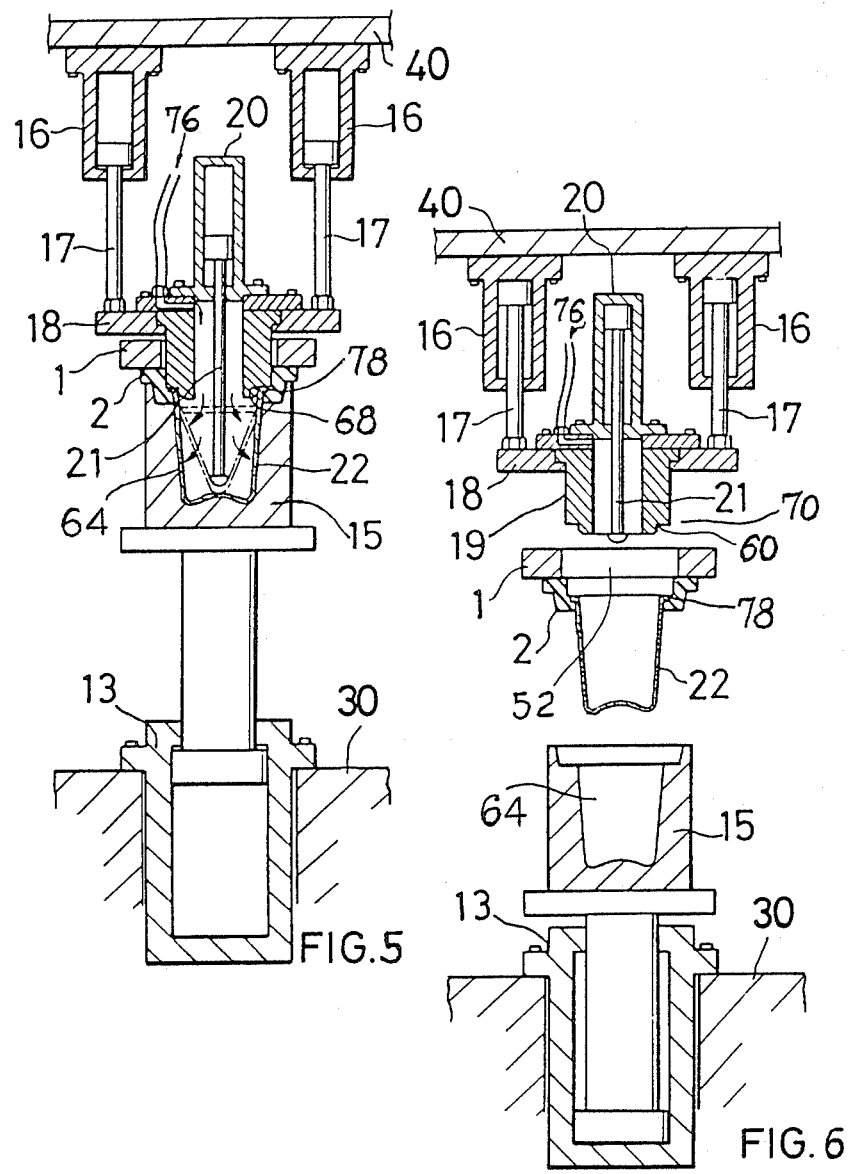

STRETCHING BLOW MOLDING APPARATUS FOR CUP-LIKE CONTAINERS

BACKGROUND OF THE INVENTION

1. Field of the Invention

This invention relates to a stretch blow molding machine for manufacturing plastic articles. More particularly, this invention relates to an apparatus which can continuously perform injection molding of a synthetic resin flat preform and stretch blow molding to create wide mouth cup-like containers.

2. Description of the Prior Art

An injection stretch blow molding machine is disclosed in U.S. Pat. No. 4,105,391. It comprises stages for injection molding of a preform, bringing the preform to a temperature suitable for stretch blow molding, stretching the preform into a blow mold and air-blowing the preform into a container such as a bottle, and removing the container. A neck mold or lip mold, which forms part of an injection mold, also serves as a holder. The mold moves together with a periodically rotating disk, transferring the preform and container from one stage to another.

In the aforementioned molding machine, the preform, which serves as a neck portion of a container, is transferred with an upper end thereof held on a neck mold and then subjected to stretching blow molding. However, where one is making a cup-like container which has no neck portion as in other containers such as bottles, it has been extremely difficult to perform injection stretch blow molding using conventional molding machinery, unless some circumferential portion of the preform is held by some means.

Generally, the means for holding a flat injection molded preform is designed so that an undercut groove is formed in an inner peripheral portion of a securing mold corresponding to a neck mold, and a preform peripheral edge serving as an open edge of a cup-like container is formed by this groove.

However, there is a disadvantage in forming such a groove in a securing mold. In addition, an undercut cannot be formed deeply to a sufficient extent even where the securing mold is split to remove an open edge from the groove, when the container is released, for example. Therefore, the peripheral edge of a preform occasionally slips partly out of the groove, as a result of the pressure produced when the preform is stretched by a stretching rod or when compressed air is introduced in the mold, causing a failure in the molding process.

Furthermore, where the preform is held by an undercut, protruding lines corresponding to the undercuts are formed annularly on the inside or outside or on both surfaces of the open edge. These lines create a difficulty in bonding a sealing material to the open edge.

Moreover, since the preform is held by the undercut, the material cannot be released unless the holder is divided. Because of the previously insurmountable difficulties in creating an alternative method of holding the preform, apparatus equivalent to container molds are presently used.

SUMMARY OF THE INVENTION

The problems encountered in the aforementioned prior art lie in molding a container such as a cup-like article as opposed to a bottle, while maintaining a sufficient grip on the preform during injection stretch blow molding. The present invention overcomes the above-described problem by the employment of a release means in the configuration of a cup, that is, the releasing means in which a molded cup is removed upwardly from the hold mold.

It is therefore an object of the invention to provide a molding apparatus in which a peripheral edge of a preform need not be formed by a groove having an undercut.

It is a further object of the invention to provide a molding apparatus wherein special holding means is not required to transfer a preform and a cup-like container.

It is a further object of the invention to provide a molding apparatus wherein a preform is not disengaged from a securing or grip mold under the pressure during the blow molding phase.

It is a further object of the present invention to provide an economical molding apparatus which can simplify the mold and the devices attached thereto, and can produce multiple cup-like containers within a small area.

These objects, as well as others not enumerated here, are achieved by the present invention which utilizes the peripheral edge of a flat preform, which ultimately forms the peripheral edge portion of a container, as a means of securing the article during the molding process. The upper surface of a securing or grip mold on a rotating transfer disk supports the peripheral edge which is sandwiched between a shoulder formed on a lower end of a blow core and the securing hold mold, during blow molding, to form a cup-like container. After the cup is fully formed, it is removed upwardly and away from the securing or grip mold.

BRIEF DESCRIPTION OF THE DRAWINGS

A more complete understanding of the present invention, as well a other objects and advantages thereof not enumerated, will become apparent upon consideration of the following detailed description, especially when considered in light of the accompanying drawings wherein:

FIG. 3 is a partial cross-sectional elevation side view of a temperature control stage according to the invention.

FIGS. 4, 5 and 6 are partial cross-sectional elevation views of a stretch blow mold apparatus according to the invention showing three different points in the stretch blow molding phase.

DETAILED DESCRIPTION OF THE INVENTION

The stretching blow molding apparatus, shown partially in the figures, has a transfer disk 1 periodically rotated at 90° intervals to coincide with four operating stages. These stages are an injection molding stage, a preform temperature-control stage, a stretch blow molding stage, and a finishing or removal stage.

Figure 1:
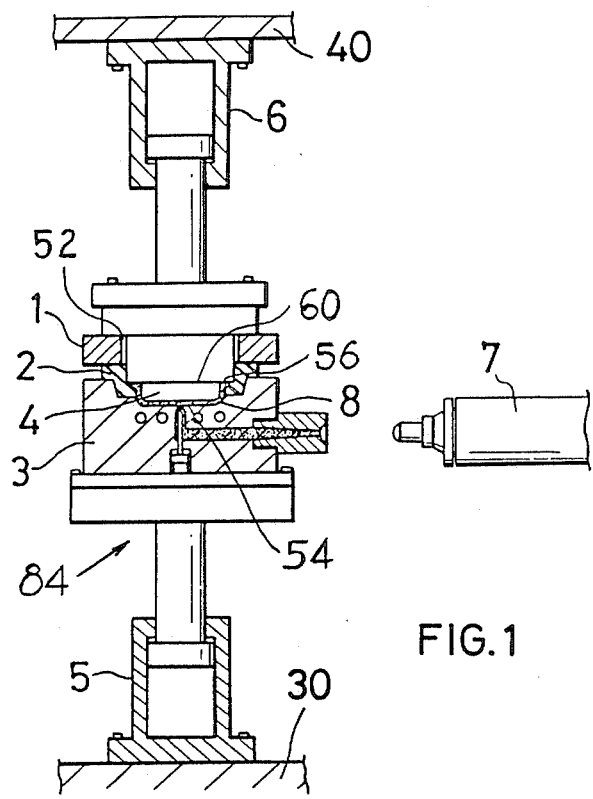
FIG. 1 is a partial cross-sectional elevation side view of an injection molding stage according to the invention.

The injection molding stage 84 has an injection mold comprising an injection mold 3 closed relative to a singlemember securing or grip mold 2 mounted on the undersurface of the transfer disk 1, and a core mold 4 inserted into and closed relative to the securing or grip mold 2, through an opening 52 having a larger diameter than a molded article provided on the transfer disk 1, from the top of the transfer disk 1, as shown in FIG. 1.

The injection mold 3 is supported by a clamping cylinder 5 secured to a base plate 30. The clamping cylinder 5 moves the injection mold 3 into registration with the lower surface 100 of the securing or grip mold 2 and the core mold 4. An injection device 7 is disposed to the side of the bottom mold 3. The core mold 4 is supported movably up and down by a clamping cylinder 6, mounted on an upper support member 40. The core mold 4 is enclosed in the securing mold 2, passing through the opening 52 of the transfer disk 1, which is rotatably mounted by means well known in the art.

A cavity 54 for first molding a preform 8 having a circular planar shape is formed between the securing or grip mold 2, the injection mold 3, and the core mold 4. To finish the preform 8, resins are further injected into the cavity 54 and are molded into the preform 8 between the injection mold 3, the core mold 4, at peripheral walls between the hold mold 23 and the core mold 4, and at a peripheral edge 56 between a shoulder 58 internally of the securing or grip mold 2 and a shoulder 60 of the core mold 4 provided opposedly of the shoulder 58.

The preform temperature-control stage 86, illustrated in FIG. 3, comprises a temperature control mold which conforms to the lower portion of the securing or grip mold 2, and a temperature control core 10 which conforms to the preform 8, to enter from the opening 52 of the transfer disk 1, as shown in FIG. 3. The temperature control mold 9 is supported on and moved vertically by an air cylinder 11 installed on the base plate 30. The temperature control core 10 is connected to an air cylinder 12 provided on the upper support member 40.

The stretch blow molding stage comprises a blow mold 15 connected to a plunger 14 of a lower clamping cylinder 13 installed on the base plate 30 below the securing or grip mold 2, and a blow core 19, as shown in FIGS. 4 through 6. The blow core 19 is connected to a central portion 62 of a plate 18 which is connected to piston rods 17 of a pair of upper clamping cylinders 16 mounted on the support member 40 and is positioned above the securing or grip mold 2.

Figure 2:
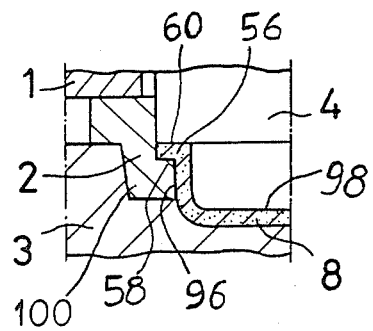
FIG. 2 is a partial cross-sectional view of an injection mold.

The blow mold 15 has a cavity 64, the upper portion 66 of which is open. The blow core 19 has a shoulder 68 at the periphery of the lower end 70 thereof, the shoulder 68 being fitted to an open inner edge 72 of the preform 8. The shoulder 68 presses the peripheral edge 56 of the preform 8 under the influence of a clamping force and holds the peripheral edge 56 together with the securing or grip mold 2, as shown in FIG. 2. A stretching rod 21, is moved up and down in the cavity 74 of the blowing core 19 by means of an air cylinder 20. Compressed air is introduced into the blow core 19 through an air channel 76. This operation yields a cup 22 having a lip 78.

Figure 7:
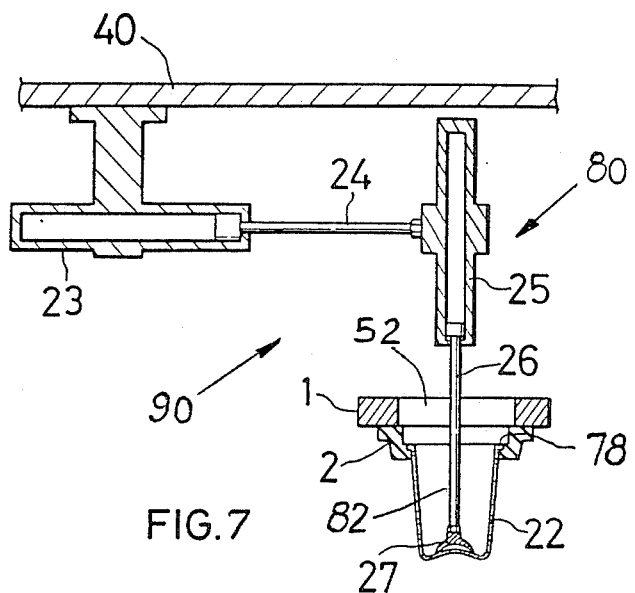
FIGS. 7 and 8 are partial cross-sectional elevation side views of the finishing or removal stage showing the release of a molded cup-like container.
Figure 8:
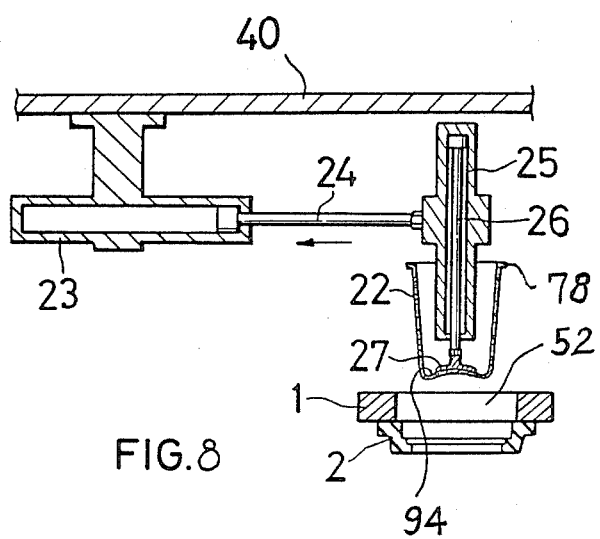

The removal or finishing stage 90 is provided with a retraction device 80 inserted into the cup 22 from the opening 52 of the transfer disk 1 to remove the cup 22 upwardly from the transfer disk 1, as shown in FIGS. 7 and 8. The retraction device 80 comprises a horizontally oriented air cylinder 25 secured to the support member 40, and a vertically oriented air cylinder 23 connected to a piston rod 24 of the air cylinder 23. An attraction or securing plate 27 is mounted on the extreme free end 82 of a piston rod 26 of the air cylinder 25. The operation of the apparatus will be described hereinafter.

Preform Manufacture by Injection Molding

The securing or grip mold 2, the injection mold 3, and the core mold 4 are arranged by action of the upper and lower clamping cylinders 5 and 6, as illustrated in FIG. 1, after which the molten resin is injected into the cavity 54 from the injection device 7 to mold a flat preform 8 having a peripheral edge 56 formed between the surface 96 of the securing or grip mold 2 and the surface 98 of the core mold 4. The injection molding stage 84 is opened, after the injection molding process has been completed, by moving the injection mold 3 downwardly and the core mold 4 upwardly. The preform 8 remains embraced by the hold mold 2.

The Temperature Control Phase

After opening, the transfer disk 1 is moved by means well-known in the art to transfer the securing or grip mold 2 and the attached preform 8 to the temperature control stage 86. When the transfer disk 1 stops, the temperature control mold 9 and the temperature control core 10 move together to sandwich the preform 8 with the peripheral edge 56 engaged by the shoulder 58 of the securing or grip mold 2 therebetween for temperature control.

The Stretch Blow Molding Phase

The preform 8, having been heated by the temperature-control stage 86, is released from the temperature-control stage 86, after which it is transferred together with the securing or grip mold 2 by movement of the transfer disk 1 to the stretch blow molding stage 88.

The blow mold 14 and the blow core 19 with the securing or grip mold 2 sandwiched therebetween are brought together. The peripheral edge 56 of the preform 8 is fixed by the shoulder 68. Thereafter, the stretching rod 21 is extended downwardly to stretch the preform 8 down to the bottom of the cavity 64 and compressed air is blown in through the air channel 76 to fully expand and mold the cup 22. In this case, the peripheral edge 56 of the preform 8 forms the open edge or lip 78 of the cup 22.

After the cup 22 has been molded, the stretch blow molding stage 88 is opened. The stretching rod 21 has returned to its original position either before or after separating the blow core 19 from the blow mold 15.

The Removal Phase

The transfer disk 1 is moved, transferring the cup 22 along with the securing or grip mold 2 to the removal stage 90. When the transfer disk 1 stops at the removal stage 90, the piston rod 26 is inserted into the cup 22 through the top 92, and the attraction or securing plate 27 is pressed against the bottom surface 94 of the cup for attraction, after which the piston rod 26 is retracted, pulling the cup 22 upwardly. Since the cup 22 is merely in a state in which the open edge 78 is placed on the upper surface 96 of the securing or grip mold 2 and is not attached to any other surface, the cup 22 is removed from the securing or grip mold 2 by being pulled as described above.

When the piston rod 24 is then retracted by the horizontal air cylinder 23, the cup 22 moves in a lateral direction along with the vertical air cylinder 25 and is carried away from and free of the transfer disk 1.

It is to be noted that the temperature control stage 86 in the above-described embodiment can be omitted. Further, removal of the finished cup can be performed at the stretch blow molding stage 88.

As will be apparent from the above-described embodiment, the peripheral edge 56 of the flat preform 8, forming the open edge or lip 78 of the cup 22 is formed by the upper surface 96 of the securing or grip mold 2 and the core mold 4. The peripheral edge 56 is held by the shoulder 68 formed at the lower end 70 of the blow core 19 while the stretch blow molding phase occurs. Therefore, even if separate holding means are not provided, the preform 8 is never disengaged as a result of the pressure produced at the time of stretching and blowing.

Furthermore, since the cup 22 after the blow core remains on the securing or grip mold 2 side with the open edge thereof placed on the shoulder 58 of the securing or grip mold 2 after the blow core 19 is retracted, the cup 22 can be removed upwardly without dividing and opening the securing or grip mold. Accordingly, the configuration of the securing or grip mold 2 can be simplified and mounting thereof on the transfer disk 1 is easily achieved.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An injection blow molding apparatus for manufacturing plastic cup-like articles from an injected preform, comprising:
    a support including a first surface for carrying and holding a preform having a peripheral edge by the peripheral edge of the preform and having an opening through the support;
    an injection stage having an injection mold part including an opening therein and a core mold part for disposition inside the opening of said injection mold part, the injection stage having means for releasably accepting the support in the opening of said injection mold part and in between the injection mold part and the core mold part to define an injection cavity in which the preform is molded and is thereafter supported and carried by the support;
    a molding stage having a blow mold for blow molding the preform into a finished article; and
    removing means for removing the finished article from the support, through the opening in the support, the removing means including means for engaging the finished article and for raising the article through the opening in the support.

2. An injection blow molding apparatus as set forth in claim 1, wherein the support further includes a shoulder on its first surface adjacent the support opening for supporting and holding the edge of the preform.

3. An injection blow molding apparatus as set forth in claim 2, wherein the support has an upstanding portion on the first surface integral with the shoulder, the upstanding portion defining the periphery of the injection cavity and the resultant preform.

4. An injection blow molding apparatus as set forth in claim 3, wherein the support has a second surface communicating with the support opening and the opening of the support releasably receives the injection mold at the first surface and the core mold at the second surface.

5. An injection blow molding apparatus as set forth in claim 4, wherein the injection mold part is in partial surface-to-surface contact with the second surface of the support and the core mold is in partial surface-to-surface contact with the first surface of the support.

6. An injection blow molding apparatus as set forth in claim 5, wherein the portion of the injection mold in surface-to-surface contact with the support conforms to the second surface of the support and the portion of the core mold in surface-to-surface contact with the support conforms to the first surface of the support.

7. An injection blow molding apparatus as set forth in claim 6, further including an opening in the blow mold and a blow core for disposition inside the opening of the blow mold, the molding stage having means, releasably accepting the support and the preform in the blow mold opening and in between the blow mold and the blow core, for forming the article, which is releasably held and supported by the support.

8. An injection blow molding apparatus as set forth in claim 7, wherein the portion of the core mold and the injection mold adjacent each other in the opening of the support conform to one another.

9. An injection blow molding apparatus as set forth in claim 8, further including means for periodically moving the support from one stage to another.

10. An injection blow molding apparatus as set forth in claim 9, wherein the means for moving the support include a disk carrying the support and having an opening coinciding with the opening of the support, the opening in the disk having a periphery greater than the periphery of the injection cavity.

11. An injection blow molding apparatus as set forth in claim 4 wherein the support in an annular ring.

12. An injection blow molding apparatus as set forth in claim 1 the removing means comprising a retraction device which is insertable into the finished article through the opening in the support.

13. An injection blow molding apparatus as set forth in claim 12, wherin the retraction device comprises a vertically oriented air cylinder having a piston rod which is vertically movable to engage the finished article.

14. An injection blow molding apparatus as set forth in claim 13, further including a securing plate attached to an extreme free end of the piston rod.

15. An injection blow molding apparatus as set forth in claim 14, in which the securing plate comprises a suction cup.

16. An injection blow molding apparatus as set forth in claim 15, further including a horizontally oriented air cylinder, the vertically oriented air cylinder being connected to and being movable horizontally by the horizontally oriented air cylinder.

* * * * *